United States Patent [19]
Platt

[11] 3,807,635
[45] Apr. 30, 1974

[54] LAWN SPRINKLING DEVICE

[76] Inventor: Glenn Harvey Platt, 1370 Balsam, Lakewood, Colo. 80215

[22] Filed: Feb. 16, 1973

[21] Appl. No.: 332,992

[52] U.S. Cl.................................. 239/213, 239/159
[51] Int. Cl......................... B05b 15/08, B05b 1/20
[58] Field of Search............ 239/212, 213, 159, 566

[56] References Cited
UNITED STATES PATENTS

| | | | |
|---|---|---|---|
| 2,860,007 | 11/1958 | Cornelius | 239/213 X |
| 1,282,142 | 10/1918 | Thompson | 239/213 |
| 1,429,756 | 9/1922 | Mitchell | 239/213 |
| 2,741,510 | 4/1956 | McCulloch | 239/213 X |
| 3,448,927 | 6/1969 | Blair | 239/212 X |

FOREIGN PATENTS OR APPLICATIONS

| | | | |
|---|---|---|---|
| 161,638 | 1884 | France | 239/213 |
| 161,639 | 1884 | France | 239/213 |
| 399,415 | 8/1924 | Germany | 239/213 |

*Primary Examiner*—Robert S. Ward, Jr.

[57] ABSTRACT

A lawn sprinkling device intended for the sprinkling of lawns in a manner providing accurate sprinkling patterns with ease of mobility and adjustability, the device including an elongated hollow pipe having a series of spaced apart apertures disposed along a portion of the circumference thereof and adapted to pass water therethrough out of the interior of the pipe to sprinkle a lawn and the like, the pipe being supported at opposite end portions by brackets adjustably secured to the pipe in a manner permitting rotative adjustment of the pipe about its longitudinal axis for accurate orientation of the apertures relative to the ground to provide an accurate sprinkling pattern thereover, one end of the pipe having a shut-off valve associated therewith for controlling the flow of water through the pipe, and a female hose fitting and a male hose fitting mounted to opposite end portions of the pipe and adapted for connecting the sprinkling device to a flexible water carrying hose or the like.

1 Claim, 3 Drawing Figures

LAWN SPRINKLING DEVICE

OBJECT OF THE INVENTION

In accordance with the foregoing, the primary object of the present invention is to provide increased accuracy in a lawn-sprinkling unit, with adjustments and accessory items which will ensure adequate water coverage with a minimum of water waste.

DESCRIPTION OF THE PREFERRED EMBODIMENT

Figure 2:
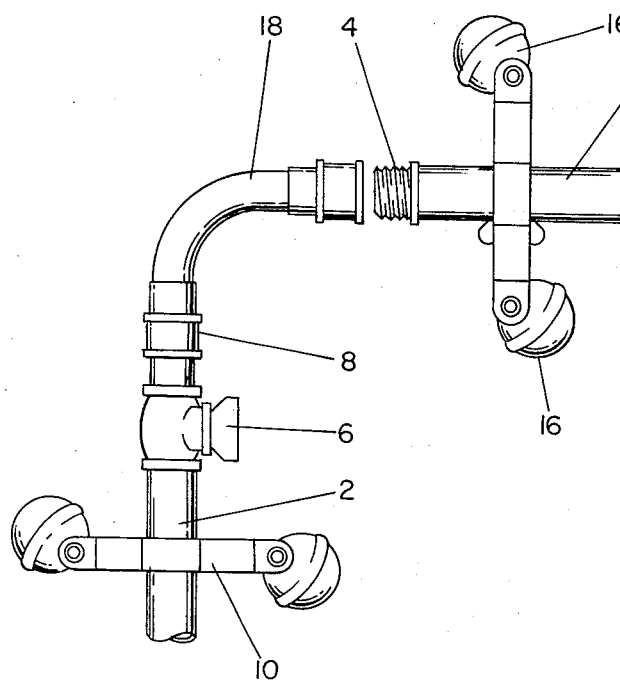
FIG. 2 is an orthographic plan view of the sprinkling device.
Figure 3:
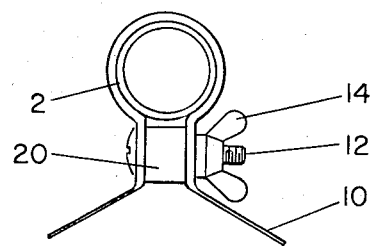
FIG. 3 is a detail end view.
Figure 1:
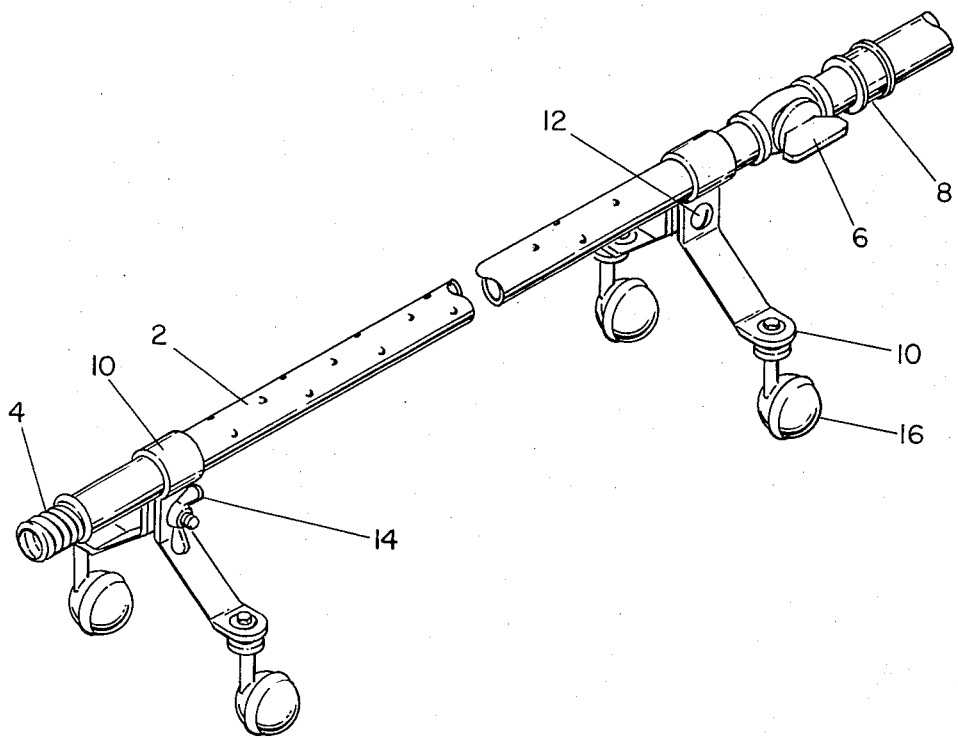
FIG. 1 is a three-dimensional drawing of the basic sprinkling device.

Referring now to the drawings there is illustrated a lawn sprinkling device constructed in accordance with the principles of the present invention and which is comprised of a hollow rigid pipe 2 made of copper or any similar suitable material, and provided with a series of a plurality of apertures extending longitudinally over a circumferal portion of the pipe and adapted for passing of water outwardly from the interior of the pipe through such apertures onto the surrounding ground for sprinkling the same.

A male hose fitting 4 is secured to one end of the pipe 2, such as by brazing or the like, with an adjustable shut-off valve 6 being affixed to the opposite end of the pipe and having a female hose fitting 8 secured thereto. The male hose fitting 4 and female hose fitting 8 define hose couplings, the female hose coupling adapted to be attached to a flexible tubular hose for delivering a source of water to the pipe 2, and the male coupling adapted to be attached by a flexible hose coupling, such as designated by reference numeral 18, to an adjacent male hose fitting 4 of a secondary sprinkling unit, such as illustrated in FIG. 2.

A pair of brackets 10 are provided, each of a generally inverted V-shape, with each bracket associated with one end of the pipe 2 with the apex of each bracket formed in a circular clamp-like member which fits about the circumference of the pipe and is adjustably secured thereto by means of a bolt 12 passing through adjacent legs of the bracket and secured thereto by means of a wing nut 14 which is used to tighten the bracket apex portion about the pipe to adjustably retain the bracket thereto. In order to prevent squeezing the pipe 2 out of its initial configuration, a tubular spacer 20 is provided concentric with bolt 12 intermediate the bracket leg portions, the spacer permitting tightening of the bracket apex about the pipe without applying any distorting compressing action on the pipe. The terminal end portions of each leg of each bracket is provided with a furniture type ball caster 16 which extends downwardly therefrom and which is rotatable about its axis as well as about its shank connecting the same to the bracket such that the sprinkling device may be easily moved about a lawn and the like.

By use of the bolt 12 and wing nut 14 it is possible to orient the apertured portion of the pipe 2 relative to the lawn so as to provide adequate water coverage of a desired lawn area with an accurate sprinkling pattern thereover such that there is a minimum of waste of water with the water directed from the sprinkler being easily directed to the desired lawn area. In addition, by using a secondary sprinkling device such as shown in FIG. 2, it is possible to sprinkle a desired area of a lawn in an accurate and efficient manner.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

In accordance with the foregoing, what is claimed is:

1. A lawn sprinkling device intended for accurately sprinkling a desired area of a lawn and the like, the device comprising a longitudinally elongated hollow cylindrical pipe having a first end and a second end, a series of spaced apart apertures extending through the side walls of said pipe over a longitudinal portion of the circumference of said pipe, a male hose fitting having one end permanently affixed to said first end of said pipe with the opposite end projecting axially outwardly therefrom and having a threaded portion extending about the circumference thereof adapted to receive a similarly threaded female hose coupling thereon, an adjustable shut-off valve having one end connected to said second end of said pipe with said opposite end projecting axially outwardly therefrom, a shut-off member associated with said shut-off valve and adapted for controlling the volume of fluid passing therethrough into said pipe, a female hose fitting having one end connected to said opposite end of said shut-off valve with the opposite end of said female hose fitting projecting axially outwardly therefrom and having a threaded interior portion adapted for receiving a similarly threaded male hose coupling for the delivery of water to said shut-off valve and thence to said pipe, a pair of spaced apart supporting brackets each of a generally inverted V-shape defining an apex supporting portion and downwardly and outwardly diverging leg portion, each bracket associated with one end of said pipe, the apex portion of each bracket forming a loop of a diameter adapted to receive said pipe therethrough with said loop engaging the circumference of said pipe, a pair of openings extending through the leg portions of each bracket immediately beneath the loop portion of said apex thereof, said openings adapted to be placed in substantial alignment when said apex portion is disposed about said pipe, an elongated threaded bolt associated with each pair of said openings and adapted to be axially inserted therethrough to bridge the apex portion of each bracket in a position disposed immediately beneath the loop forming apex thereof, a wing nut fastening means adapted to be threadedly fastened onto the projecting threaded end of said bolt wherein the head of the bolt engages the exterior surface of one of said bracket legs with said wing nut engaging the exterior surface of said opposite leg of said bracket such that rotation of the wing nut in opposite directions about its axis effects both the tightening and loosening of said loop apex portion of said bracket about said pipe depending upon the direction of rotation of said wing nut, an elongated cylindrical tube spacer disposed concentric with said bolt intermediate said bracket leg portion and having one edge adapted to engage the interior surface of one of said bracket leg members with the opposite end adapted to engage the interior surface of said opposite leg member, the length of said spacer being less than the diameter of said pipe, said spacer adapted to permit the tightening of said bracket about said pipe while simultaneously preventing any application of excessive distorting forces to said pipe so as to prevent any distortion of the pipe configuration by said bracket, each of said bracket legs terminating in a position spaced downwardly and outwardly from the axis of said pipe, each terminal end of each bracket leg having a caster wheel associated therewith and rotatably mounted thereto to provide ease of rollability of said pipe about said lawn, and said pipe being rotatable about its longitudinal axis relative to said bracket for orienting said apertures relative to said lawn with the said bolt and wing nut locking said pipe in said desired adjusted oriented position for the sprinkling of a desired area of the lawn, said pipe being readily readjustable as to rotation about its longitudinal axis such that the orientation of the apertures relative to said lawn is readily selectable by an individual using the sprinkling device.

* * * * *